H. E. WINSLOW.
GRAIN SEPARATOR.
APPLICATION FILED SEPT. 2, 1919.
1,386,298.
Patented Aug. 2, 1921.
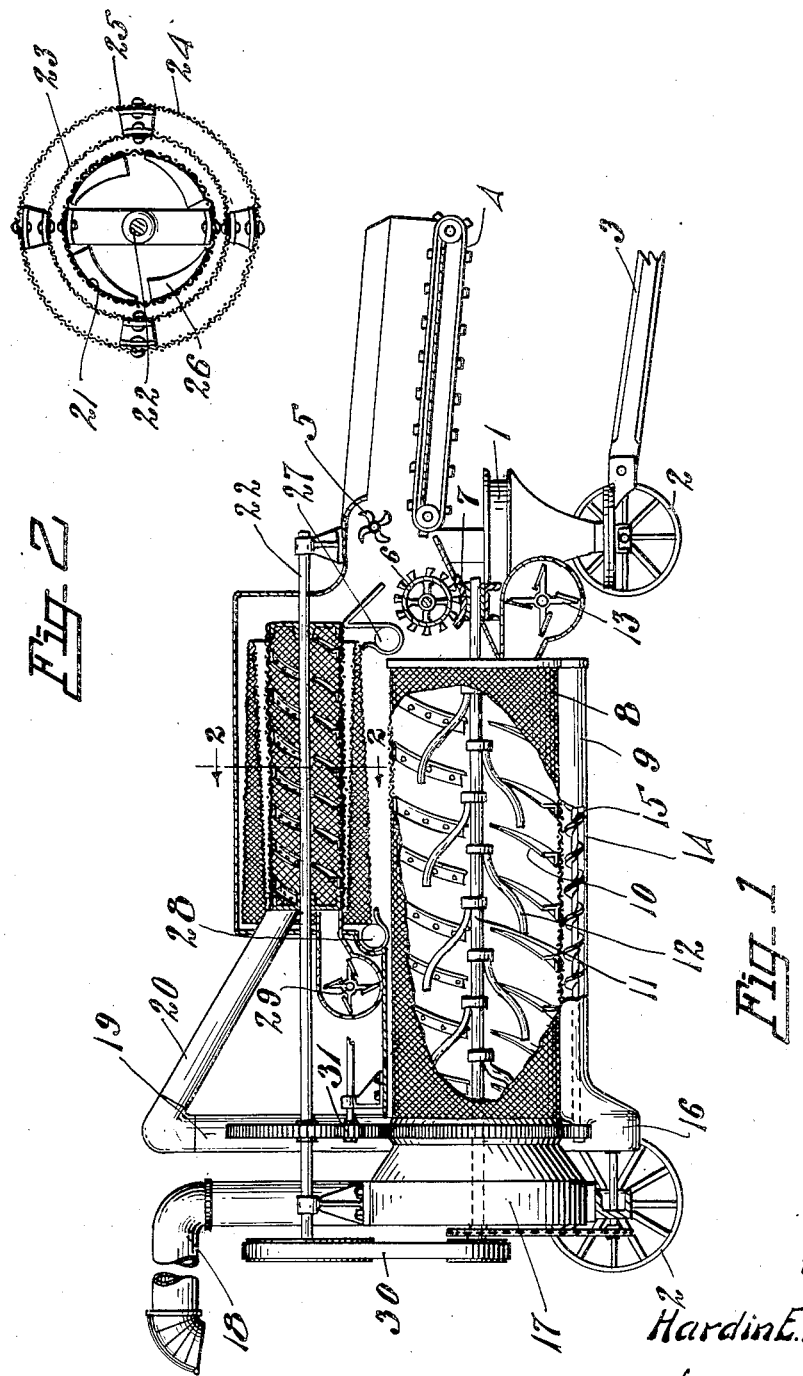
Inventor
Hardin E. Winslow
By Herbert E. Smith
Attorney

UNITED STATES PATENT OFFICE.

HARDIN E. WINSLOW, OF SPOKANE, WASHINGTON, ASSIGNOR OF ONE-HALF TO WARREN T. WINSLOW, OF SPOKANE, WASHINGTON.

GRAIN-SEPARATOR.

1,386,298.   Specification of Letters Patent.   Patented Aug. 2, 1921.

Application filed September 2, 1919. Serial No. 320,991.

*To all whom it may concern:*

Be it known that I, HARDIN E. WINSLOW, a citizen of the United States, residing at Spokane, in Spokane county, and State of Washington, have invented certain new and useful Improvements in Grain-Separators, of which the following is a specification.

My present invention relates to improvements in grain separators designed especially as a portable machine for separating the grain and seed from the straw and chaff and for thoroughly cleaning the grain and disposing of the dust and chaff, and the invention involves certain novel combinations and arrangements of parts particularly applicable for use in rotary, screen separators, as will be hereinafter pointed out and claimed.

In the accompanying drawings I have illustrated one complete example of the physical embodiment of my invention, the parts being combined and arranged according to the best mode I have so far devised for the practical application of the principles of my invention.

Figure 1 is a view in side elevation, showing some parts broken away and in section for convenience of illustration, of a grain separator involving the novel features and combinations of construction of the present invention.

Fig. 2 is a transverse vertical sectional view on line 2—2 of Fig. 1 showing the screens for the re-cleaner.

In the preferred form of the invention as illustrated in the drawings a wheeled machine is utilized, and the improved features and combinations of parts form a unitary structure or machine for cleaning and re-cleaning the grain and separating therefrom the straw and chaff.

The machine is provided with a main frame 1 and supported on the four wheels 2, a tongue 3 being indicated for attachment of the draft horses or vehicle, while the machinery for separating and cleaning the grain is power driven as usual, the source of power not being shown.

The straw and grain are fed to the table 4, in the form of an endless, slatted, conveyer at the front of the machine, and from this feed table the grain and straw pass toward the rear under the rotary straw cutter 5 extending transversely of the machine at the rear of the feed table which cutter is of usual type for the purpose, and from the cutter the straw and grain pass under the threshing cylinder 6 and over the concave 7 where the straw and grain are treated to the usual beating or threshing as they pass between the cylinder and its concave. At the rear of the transverse threshing cylinder is arranged a longitudinally disposed rotary cylindrical screen 8, movable in the closed housing 9 and having on its inner walls a series of segmental strips 10 made of angle iron and arranged in spiral rows in order that the material within the rotary cylinder may be conveyed to the rear of the cylinder by its movement. Within the rotary screen is supported the longitudinal shaft 11 to which are fastened the rearwardly extending metallic bands 12 that project from the shaft and extend to the rear as agitators or beaters to co-act with the spiral conveyer irons on the inner wall of the screen. As the grain and straw pass from the concave they are assisted by the blast from the fan 13 which forces currents of air into the screen cylinder and from the action of the agitators and guide blades spirally arranged the grain passes through the reticulations of the screen and falls into the trough 14 from whence it is taken by the screw conveyer 15 to the hopper 16, the straw and other materials other than the seeds of grain, passing through the cylinder to the blower 17 and from thence through the stacker tubes 18 to be stacked. In this manner, the grain and straw received from the threshing cylinder and its concave are again treated in the cylinder, for as the straw and grain are stirred up by the action of the agitators the grain is thrown against the walls of the cylinder and any unseparated grain is thus separated and passed through the reticulated screen to the screw conveyer.

A re-cleaning or separating of the grain is provided for at this point, and the grain is conveyed from the hopper 16 up through the elevating tube 19 and thence down through the inclined pipe 20 to the re-cleaning screens that are disposed above the separator screens, toward the front of the machine or machines.

A transverse, vertical, sectional view of the re-cleaning screens is shown in Fig. 2, the inner cylinder 21 being supported on and revoluble with the shaft 22, while the two outer screens 23 and 24, which are connected at their ends by brackets 25 also revolve with the inner screen and shaft.

The three screens are all of reticulated material and the interior or smaller screen, which is cylindrical in form is provided with conveyer blades 26 throughout its length to insure passage of the seed grain toward the front of the inner rotary screen and in its passage the grain falls through the first or inner screen to the inner tapering screen 23 which enlarges toward the front and by this rotary screen the grain is finally delivered to the transverse conveyer 27 and thence to the waiting sacks for the cleaned grain. The second screen is of proper size to retain the grain, but to permit the passage of foul or wild seed and this latter seed passes through the second screen to the third screen which enlarges toward the rear so that the foul or wild seed pass along this outer screen to the rear and is carried away by the sacking conveyer 28 to be used as chicken feed. Any seed and straw passing to the front through the inside cylinder will be returned to the cylinder and concave to again pass through the separating and recleaning devices, and in this manner the grain is finally cleaned and disposed of to advantage, the chaff being stacked and the grain sacked in usual manner. A fan 29 is located at the rear of the reticulated recleaning screens, and the housing 9 incloses the described parts, while the usual belt drive indicated at 30 and gear drive indicated at 31 are employed to operate the different parts of the machinery in usual manner.

What I claim is—

The combination in a grain separator with a longitudinal rotary screen and means for carrying straw therefrom, and a threshing device delivering to said screen, of a conveyer for transporting grain from said screen and a second rotary screen co-acting with the conveyer, means in said second screen to convey chaff through its forward end to be returned by said threshing device to the first screen, an intermediate rotary screen concentric with and surrounding said second screen and increasing in diameter toward its delivery end, a conveyer at said delivery end, and an outer rotary screen increasing in diameter toward its delivery end opposite the delivery end of the intermediate screen, for the purpose described.

In testimony whereof I affix my signature.

HARDIN E. WINSLOW.